United States Patent [19]
Aravind et al.

[11] Patent Number: 5,214,507
[45] Date of Patent: May 25, 1993

[54] VIDEO SIGNAL QUANTIZATION FOR AN MPEG LIKE CODING ENVIRONMENT

[75] Inventors: Rangarajan Aravind, Matawan; Hsueh-Ming Hang, Morganville; Barin G. Haskell, Tinton Falls, all of N.J.; Atul Puri, New York, N.Y.

[73] Assignee: AT&T Bell Laboratories, Murray Hill, N.J.

[21] Appl. No.: 790,285

[22] Filed: Nov. 8, 1991

[51] Int. Cl.$^5$ .............................................. H04N 7/12
[52] U.S. Cl. .................................. 358/133; 358/136; 382/56
[58] Field of Search ............... 358/133, 138, 136, 135, 358/105; 382/56

[56] References Cited

U.S. PATENT DOCUMENTS 4,780,761 10/1988 Daly et al. ........................... 358/133
5,113,256 5/1992 Citta et al. ........................... 358/133

Primary Examiner—Victor R. Kostak
Attorney, Agent, or Firm—Eugene J. Rosenthal; Ronald D. Slusky

[57] ABSTRACT

A quantization parameter for use in encoding a region of an image is developed from a) a categorization of the region into one of a predetermined plurality of perceptual noise sensitivity (PNS) classes, b) a level of psycho-visual quality that can be achieved for the encoded version of the image, the level being selected from among a plurality of predetermined levels, and c) a prestored empirically derived model of the relationship between the PNS classes, the psycho-visual quality levels and the values of the quantization parameter. PNS indicates the amount of noise that would be tolerable to a viewer of the region, i.e., the perceptual sensitivity of the region to noise. Some characteristics on which PNS classes may be based are: spatial activity, speed of motion, brightness of the region, importance of the region in a particular context, the presence of edges within the region and the texture of the region, e.g., from "flat" to "highly textured". PNS classes that include combinations of the characteristics of a region of the image may also be defined. The PNS classes employed are selected by the implementor and may be determined empirically. The psycho-visual quality of an encoded image is the quality, as perceived by a viewer, of the version of the image that is reconstructed from the encoded image. It is determined from the complexity of the image and the bit-rate available to encode the image.

12 Claims, 3 Drawing Sheets

VIDEO SIGNAL QUANTIZATION FOR AN MPEG LIKE CODING ENVIRONMENT

TECHNICAL FIELD

This invention is related to video image processing and, more particularly, to the adjusting of encoder quantization step size so as to regulate the quality of the reconstructed image and the bit rate of the encoded image.

BACKGROUND OF THE INVENTION

The manner in which a video signal is quantized determines the bit rate of the encoded signal and the quality of the image reconstructed from that encoded signal. Perhaps most significant in this context is the quantization step size, which is derived from a predetermined mapping of the so-called quantization parameters and which directly controls the coarseness/fineness of the quantization employed in developing the encoded signal. Therefore, in order to achieve the maximum picture quality for a particular predetermined target bit rate, the quantization parameters need to be appropriately selected.

Prior approaches to selecting the quantization parameters have been statistically based, have required computations necessitating that the entire image or portions thereof be processed multiple times, or have employed models of the human visual system. These prior approaches are complex, require large amounts of memory or introduce large delays. Moreover, such prior solutions typically ignore the nature of non-homogeneous regions of an image, such as edges. Furthermore, none of the prior solutions employs a single quantization parameter in an effective manner. A single quantization parameter is in fact required, however, by the video coding syntax of the Motion Picture Expert Group (MPEG), as set forth in the International Standards Organization (ISO) standard Committee Draft 11172-2.

SUMMARY OF THE INVENTION

The above-described difficulties with prior quantization techniques are overcome, in accordance with the principles of the invention, by determining a quantization parameter for use in encoding a region of an image from a) a categorization of the region into one of a predetermined plurality of perceptual noise sensitivity (PNS) classes, b) a level of psycho-visual quality that can be achieved for the encoded version of the image, the level being selected from among a plurality of predetermined levels, and c) a prestored empirically derived model of the relationship between the PNS classes, the psycho-visual quality levels and the values of the quantization parameter. PNS indicates the amount of noise that would be tolerable to a viewer of the region, i.e., the perceptual sensitivity of the region to noise. The PNS classes are determined based upon ranges of values of the visual characteristics which may be found in a region of an image. Some characteristics on which PNS classes may be based are: spatial activity, speed of motion, brightness of the region, importance of the region in a particular context, the presence of edges within the region and the texture of the region, e.g., from "flat" to "highly textured". PNS classes that include combinations of the characteristics of a region of the image may also be defined. The PNS classes employed are selected by the implementor and may be determined empirically. The psycho-visual quality of an encoded image is the quality, as perceived by a viewer, of the version of the image that is reconstructed from the encoded image. It is determined from the complexity of the image and the bit-rate available to encode the image. Of course, different regions of the image can be encoded with different values of the quantization parameter.

In an exemplary embodiment, the regions are macroblocks and subblocks into which the image is divided. Also, the relationships between the PNS classes, the psycho-visual quality levels, the quantization step sizes, the image complexity and the available bit-rate are empirically derived. Furthermore, these relationships are codified as a set of tables. These tables are designed to optimize the psycho-visual quality of the encoded image for any given allowable bit rate.

In accordance with an aspect of the invention, there is stored, in the table relating PNS classes, psycho-visual quality and quantization parameter, an allocation of the quantization parameter to each of the PNS classes for each psycho-visual quality level. Each of the allocations for a particular psycho-visual quality level is expected to yield an encoded image that achieves that psycho-visual quality level. However, for each different quality level, the number of bits that result in the encoded image will be different. Therefore, estimates of the number of bits expected in the encoded image, when the image is encoded to achieve an intended psycho-visual quality level, are developed.

To develop these bit estimates, an independent classification of the subblocks into one of a plurality of statistical activity classes is employed. The variance of the subblock is employed as the criterion for measuring the statistical activity of a subblock. In accordance with an aspect of the invention, a so-called "bits table" is employed to determine the number of bits that are expected to be generated to encode any subblock, given its statistical activity class and the quantization parameter to be used. The bits table and a histogram of the distribution of the subblocks of the image among both the PNS classes and the statistical activity classes are used to develop the abovementioned estimates of the number of bits to be used to encode the entire image for the intended quality level. The psycho-visual quality level that yields an actual bit count for the image that is closest to the desired target bit count for the image is selected to encode the image.

The estimate of the number of bits actually generated is compared with a target number of bits for encoding the entire image so that adjustments to the sequence of quantization parameters can be made, as the encoding of the image proceeds, to more closely align the estimate with the target. Such an alignment corresponds to aligning the actual bit rate of the encoded signal to a target bit rate for the signal. Furthermore, all the quantization parameters to be employed for each image and the corresponding quantization step sizes are determined in only one pass through all of the blocks of the image. To do so, a previous image is used to estimate the probability distribution function of the subblocks of the current image.

BRIEF DESCRIPTION OF THE DRAWING

In the drawing:

Shown in FIG. 1, in simplified block diagram form, is an adaptive perceptual quantizer, in accordance with the principles of the invention;

Figure 2:
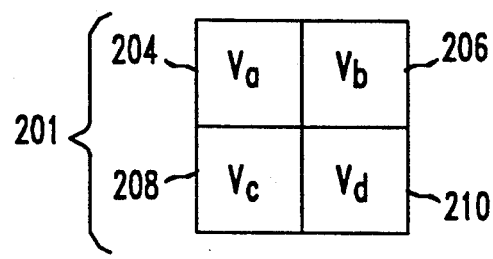
Figure 3:
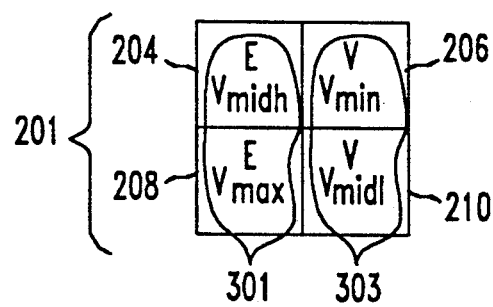
Figure 4:
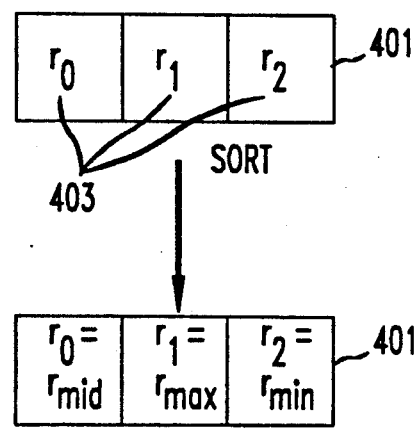

Shown in FIG. 2 is an exemplary macroblock divided into subblocks;

Shown in FIG. 3 is the same macroblock shown in FIG. 2, with its subblocks labelled appropriately after sorting;

Shown in FIG. 4 are two arrays containing variance ratios; and

Figure 5:
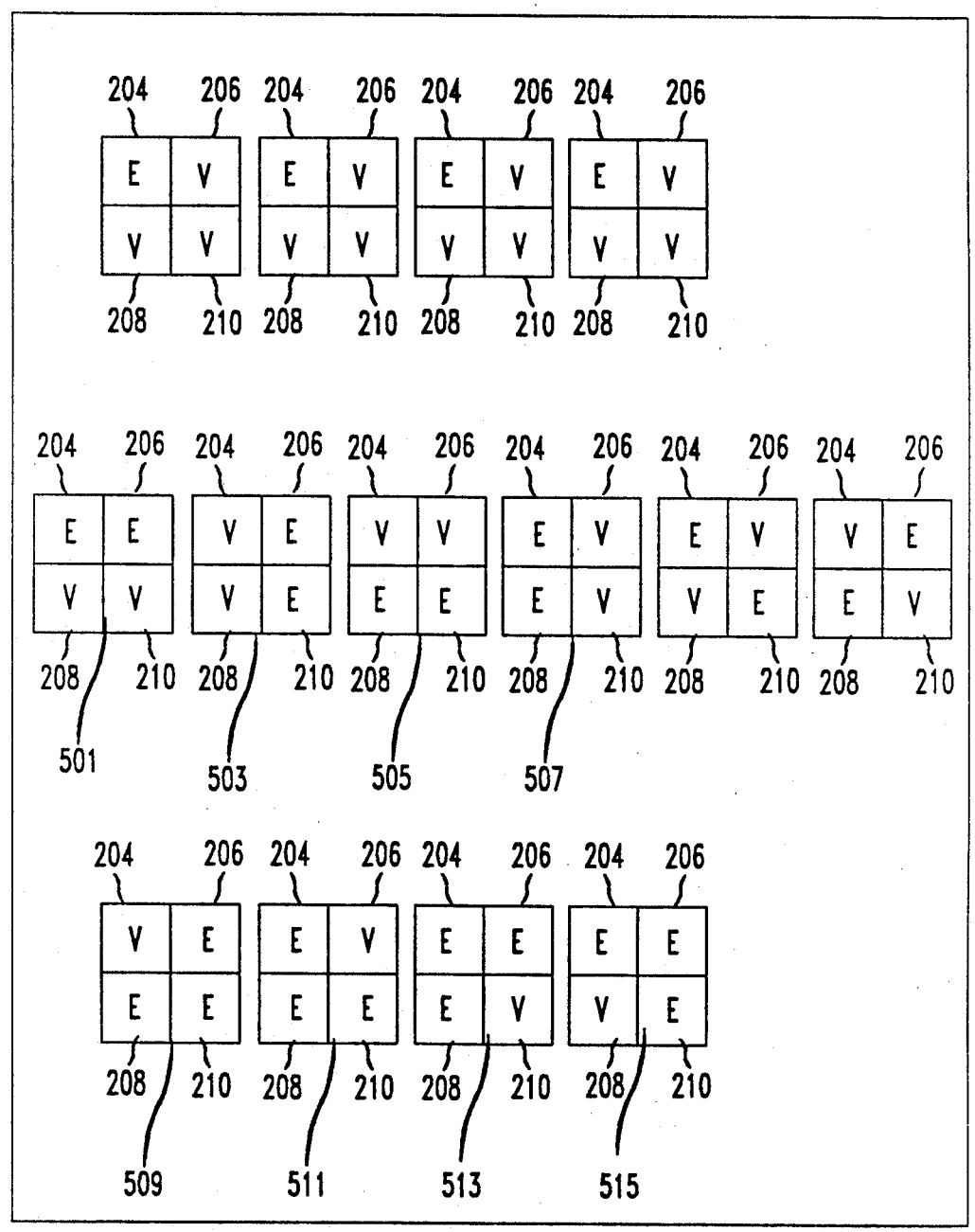

Shown in FIG. 5 are the three possible types of nonhomogeneous macroblocks and all the allowed combinations of assignments of subblocks therein to statistical activity classes in the EMAC and VMAC subgroups.

DETAILED DESCRIPTION

Figure 1:
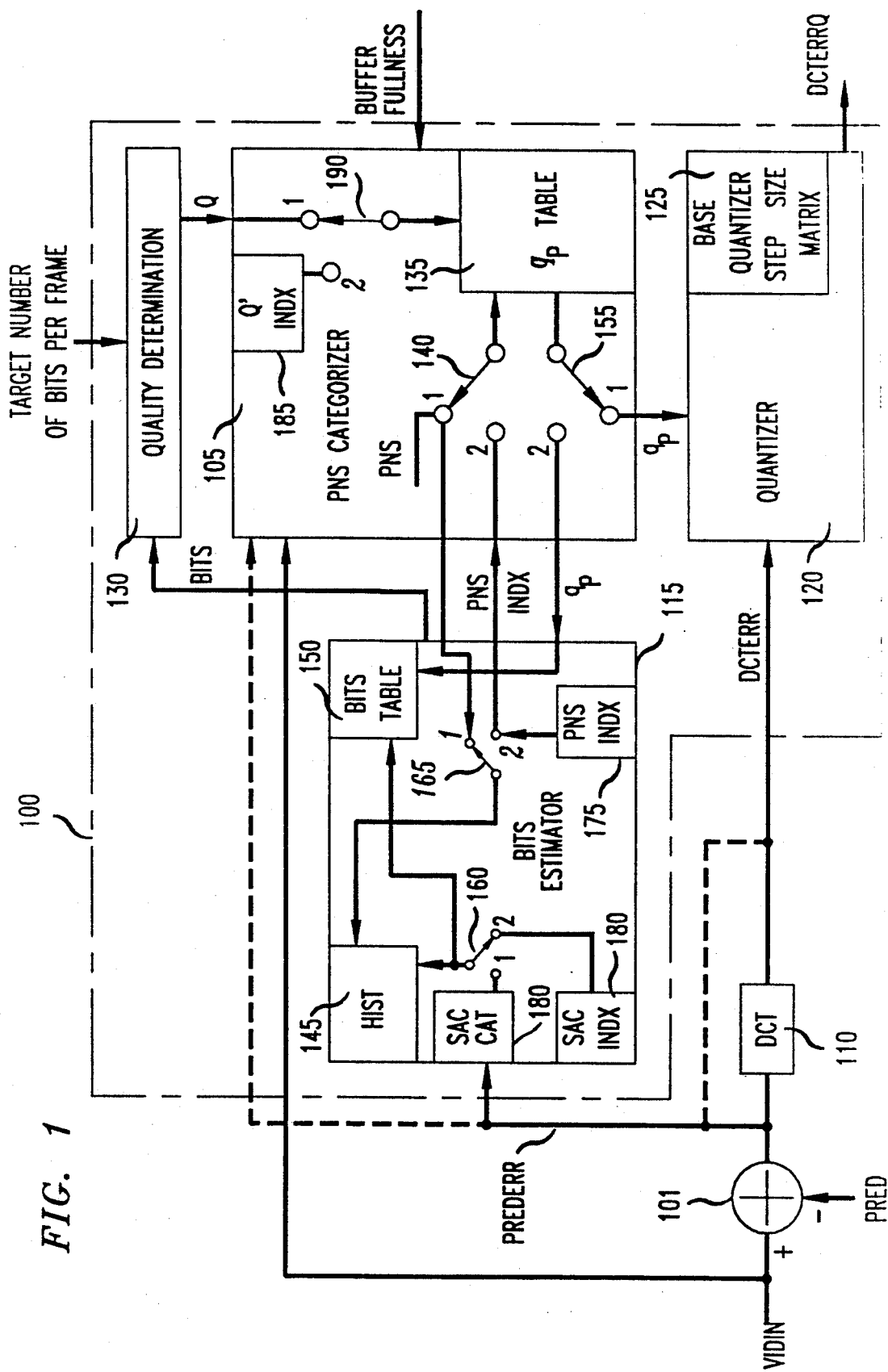

Shown in FIG. 1, in simplified block diagram form, is adaptive perceptual quantizer 100, employing the principles of the invention, for use in a motion compensated predictive/interpolative video encoder. To aid in the understanding of the operation of adaptive perceptual quantizer 100, also shown are subtracter 101 and discrete cosine transform (DCT) 110—hereinafter referred to as DCT 110—which are part of the motion compensated predictive/interpolative video encoder (not shown).

Original video signal VIDIN, which is a series of frames containing images, is supplied to subtracter 101 and perceptual noise sensitivity (PNS) categorizer 105. For interframe differentially encoded frames of signal VIDIN—which encompasses both predictively encoded and interpolatively encoded frames—subtractor 101 is also supplied with signal PRED which represents the predicted version of the frame that is being supplied as signal VIDIN. If the frame of signal VIDIN is being intraframe coded, PRED is a null image, i.e., all zero. Subtracter 101 substracts a frame of PRED from the frame in signal VIDIN that the frame of PRED represents, and generates a frame of prediction error signal PREDERR. Therefore, for interframe differentially encoded frames, signal PREDERR represents images in the picture element, or pel, domain, which, when added to signal PRED, yield signal VIDIN. If the frame of signal VIDIN is intraframe coded, signal PREDERR will be identical to signal VIDIN.

Pels of signals VIDIN and PREDERR are grouped into subblocks which are two-dimensional arrays of pels. A typical luminance subblock size is 8×8 pels. These 8×8 subblocks of pels may also be grouped together into macroblocks. An exemplary macroblock includes four contiguous subblocks of luminance, arranged in a 16×16 array of pels, and all of the chrominance subblocks that are cosited with the luminance subblocks. Only the luminance macroblocks and subblocks are employed during processing in the embodiment of the invention described herein-below.

DCT 110 converts signal PREDERR to the discrete cosine domain and generates transform coefficients that are supplied as signal DCTERR to quantizer 120. It is the transform coefficients of signal PREDERR that are to be quantized by quantizer 120. DCT 110 operates on the aforementioned subblocks of pels of signal PREDERR, e.g., 8×8 pels per subblock, when performing the discrete cosine transform. DCT 110 yields, as an output 8×8 subblocks of transform coefficients. Just as 8×8 subblocks of pels may be grouped into macroblocks, as described above, so too these 8×8 subblocks of transform coefficients may also be grouped together into macroblocks of transform coefficients.

Quantizer 120 contains memory 125 which stores a base quantizer step size matrix. The base quantizer step sizes, which are the elements of base quantizer step size matrix, are arranged such that one base step size corresponds to, and will be employed for quantizing, one of the transformed coefficients of each subblock of signal DCTERR. Thus, base quantizer step size matrix is an 8×8 matrix.

In addition to signal DCTERR, quantizer 120 also receives as an input, from PNS categorizer 105, a quantization parameter $q_p$. Quantizer 120 uses the base quantizer step size matrix and quantization parameter $q_p$ to generate signal DCTERRQ, a quantized version of the transformed error signal DCTERR, which is supplied as an output. The actual quantizer step size to be employed for quantizing each coefficient of signal DCTERR is developed by multiplying the value of $q_p$ by a respective element of the base quantizer step size matrix.

PNS categorizer 105 categorizes each macroblock of signal VIDIN into one of a predetermined plurality of perceptual noise sensitivity (PNS) classes. PNS indicates the amount of noise that would be tolerable to a viewer of the region, i.e., the perceptual sensitivity of the region to noise. The PNS classes are determined based upon ranges of values of the visual characteristics that may be found in a region of an image. This is because the sensitivity of the human eye to noise varies according to the nature of the visual characteristics of the region within which the noise appears. Some characteristics on which PNS classes may be based are: spatial activity, speed of motion, continuity of motion, brightness of the region, importance of the region in a particular context, the presence of edges within the region and the texture of the region, e.g., from "flat" to "highly textured". PNS classes that include combinations of the characteristics of a region of the image may also be defined.

One goal of adaptive perceptual quantizer 100 is to adjust the placement of the noise that results from quantization so that as much of the noise as possible appears where it is least visible, while simultaneously ensuring that noise-sensitive areas of the image are relatively finely quantized. Therefore, flat and low-detail areas, where the blockiness (i.e., where the subblock boundaries become perceivable,) can occur, must be quantized relatively finely. However, busy and textured areas, where noise is less visible, can be quantized relatively coarsely. In an embodiment that corresponds to the MPEG standard, only one quantization parameter $q_p$ need be developed for each macroblock.

In accordance with the principles of the invention, PNS categorizer 105 determines a quantization parameter $q_p$ for each macroblock as a function of both the PNS category into which the macroblock has been categorized and a predetermined psycho-visual quality level Q that it is anticipated can be achieved for the encoded version of the image in the frame being encoded. The psycho-visual quality level is received as an input by PNS categorizer 105 from quality determination unit 130. The determination of the psycho-visual quality level of the image in the frame will be discussed further below.

In the exemplary embodiment shown, the relationships between Q, $q_p$ and the PNS classes are stored in $q_p$ table 135, within PNS categorizer 105. An exemplary $q_p$ table is shown in Table 1. Typically this table will have the same number of columns as the number of PNS categories implementor has defined. In preferred embodiments this table will have 20 columns. A table having a small number of classes, such as the table shown in Table 1, will suffice to describe the illustrative embodiment and the principles of the invention.

TABLE 1

SAMPLE $q_p$ TABLE

| Psycho-Visual Quality Level (Q) | PNS Classes | | | | | | | | |
|---|---|---|---|---|---|---|---|---|---|
| | $C_{3a}$ | $C_{3b}$ | $C_4$ | $C_5$ | $C_6$ | $C_7$ | $C_8$ | $C_9$ | $C_{10}$ |
| 5 | 3 | 3 | 3 | 4 | 4 | 5 | 5 | 6 | 6 |
| 4 | 4 | 3 | 4 | 5 | 6 | 6 | 7 | 7 | 8 |
| 3 | 5 | 4 | 5 | 6 | 6 | 7 | 8 | 8 | 9 |
| 2 | 5 | 4 | 5 | 6 | 7 | 8 | 9 | 11 | 12 |
| 1 | 6 | 5 | 6 | 7 | 8 | 9 | 10 | 11 | 12 |
| 0 | 7 | 6 | 7 | 8 | 10 | 11 | 13 | 14 | 15 |

Table 1 is arranged such that the index of the rows is the psycho-visual quality level Q and the index of the columns is the PNS class. Although the Q for a frame may be adjusted to account for mismatch in the number of bits produced with respect to the targeted number of bits that eventually results, as will be further discussed below, it is assumed for clarity of exposition at this point, that Q is constant during the encoding of an entire frame.

The number and types of PNS classes employed in the $q_p$ table are usually selected on the basis of experimentation with real images. Furthermore, values of $q_p$ in the $q_p$ table are typically determined experimentally for the range of qualities and types of images expected for a particular application. The objective of such experiments would be to determine a $q_p$ table wherein values of $q_p$ for all of the PNS classes at a particular psycho-visual quality level produces approximately equal perceived noise throughout an image encoded for that psycho-visual quality level, without regard for the content of the image, e.g., smoothness, speed of motion, brightness, etc.

One such experiment, for determining the values of $q_p$ to be placed in the $q_p$ table, requires that an encoder and a decoder be operated back-to-back at a constant psycho-visual quality level without any constraints being placed on the channel bit rate. Q=0 is the minimum psycho-visual quality for the application for which the $q_p$ table is being developed. The $q_p$ values for the Q=0 row of Table 1 would initially be derived by trial and error so that an image in which the perceived noise as uniform as possible is achieved. Thus, for a representative image, the $q_p$ values are adjusted, either one at a time or in combination, until a viewer indicates that he perceives that the noise present in the image is distributed uniformly over the entire image. The values of $q_p$ for each PNS class are recorded in the $q_p$ table. This procedure may be repeated over a set of images until $q_p$ values for each PNS class remain essentially unchanged from image to image and the perceived noise in each image of the set is indicated to be distributed uniformly throughout the image.

As an initial guess for the $q_p$ values for the next highest psycho-visual quality level, e.g., for Q=1 in Table 1, each $q_p$ value of the preceding psycho-visual quality level is reduced by one (1). This results in an effective reduction in the quantization step size and an increase in the psycho-visual quality level of the reconstructed image. If some portions of the image, corresponding to particular PNS classes, are perceived to have less noise than the remainder of the image, the $q_p$ values for those PNS columns are reduced until a uniform distribution of the perceived noise is achieved throughout the image. Similarly, if some portions of the image, corresponding to particular PNS classes are perceived to have more noise than the remainder of the image, the $q_p$ values for those PNS columns are increased until a uniform distribution of the perceived noise is achieved throughout the image. Once the perceived noise is uniform over the entire image, or set of images, as described above, the new $q_p$ values for each PNS class are recorded in the $q_p$ table. This procedure is then repeated for each row of the $q_p$ table until the table is entirely filled.

During encoding, PNS categorizer 105 categorizes each macroblock of signal VIDIN, which is being encoded, into the one of the available PNS classes into which it best fits. Switch 140 is in position 1, and, in accordance with an aspect of the invention, the PNS class into which the macroblock has been categorized is supplied to the $q_p$ table. The position of switch 140, as well as all other switches discussed below, is under the control of a quantizer controller (not shown). In accordance with the principles of the invention, the intersection of the row having an index value of the Q value anticipated for the frame, which is supplied from quality determination unit 130 via switch 190, and the column having an index value equal to the PNS class into which the macroblock has been categorized is determined. In accordance with an aspect of the invention, the $q_p$ value at the determined intersection is employed to encode the macroblock, as described above, and to this end it is supplied to quantizer 120.

In one embodiment of adaptive perceptual quantizer 100, the PNS classes are substantially based on the spatial activity in a macroblock. This is because the variance of the macroblock is a primary indicator of the spatial activity of the macroblock and, therefore, a primary indicator of the PNS class to which a macroblock belongs. The variance of a macroblock can be computed by averaging the variances of the four luminance 8×8 subblocks included within the macroblock. The variances of each of the subblocks of a macroblock are denoted $v_a$, $v_b$, $v_c$ and $v_d$ from left to right and top to bottom, respectively. Also, the maximum and minimum variances $v_{max}$, $v_{min}$ from among the subblocks of the macroblock and the average variance $v_{av}$ for the macroblock are determined.

The activity level present in a macroblock is analyzed in PNS categorizer 105, by examining the variances of the subblocks therein, to determine if the macroblock contains a low detail area, a textured area, or several different types of areas that tend to indicate the presence of edges. Macroblocks that contain only low-detail or textured areas are referred to as homogeneous macroblocks and can be immediately be categorized into a PNS class based on the variance of the macroblock. Macroblocks that do not meet the requirements to be declared homogeneous are declared to be nonhomogeneous.

Several tests can be performed to determine if a macroblock is homogeneous. A property of a homogeneous macroblock is that the value of the variances of the four subblocks therein are "close" to one-another. The first test performed on the macroblock, in this embodiment, is the low-detail test which determines if the entire macroblock is one of low detail. To pass the low-detail test and be classified as a low detail macroblock, the following two conditions must both be satisfied:

(i) $v_{av} < T_1$, and (ii) $v_{max} < T_2$ where $T_1$ and $T_2$ are predetermined thresholds for 8-bit pixels having values ranging from 0 to 255. A typical value of threshold $T_1$ is 45. Threshold $T_2$ is typically four times $T_1$.

If a macroblock does not pass the low-detail test for homogeneity, a texture test is performed on the macroblock to determine if the macroblock is a homogenous texture macroblock. To pass the texture test, and be classified as a homogenous texture macroblock, condition (iii) and either of conditions (iv) or (v) below must be satisfied.

$$v_{min} > T_1. \quad \text{(iii)}$$

Two of the three ratios $\frac{v_{max}}{v_{sbk}} < T_3$ and the third ratio $< T_4$. (iv)

All three ratios $\frac{v_{max}}{v_{sbk}} < T_5$. (v)

where, $v_{sbk}$ refers to the value of the variance of an individual subblock whose variance is less than $v_{max}$. Typically, $T_3$ is 2.5, $T_4$ is 4.0, and $T_5$ is 3.25. In the division operations performed above, if the variance of a subblock is less than a threshold $T_0$, it is set to $T_0$. This avoids division by zero as well as enabling more meaningful ratio tests. A typical value for $T_0$ is 10. It is also worth noting that the thresholds used in these tests can be modified so as to control the number of macroblocks that are classified as homogeneous with respect to the number of macroblocks that are classified as nonhomogeneous. As thresholds $T_3$, $T_4$ and $T_5$ are increased, the number of macroblocks that will be declared as homogeneous increases proportionately.

In this embodiment, a homogeneous macroblock is assigned a PNS class substantially on the basis of its variance. The potential range of macroblock variance is partitioned into 16 predetermined classes, and one PNS class is associated with each interval. The thresholds defining these intervals are given in Table 2. The PNS class of a homogeneous macroblock is determined by the interval in which the variance of the macroblock lies. The basic 16 PNS classes of this embodiment are designated $C_0, \ldots, C_{15}$. The PNS thresholds are much closer at the low-variance end, where fine resolution is beneficial.

The PNS thresholds may be found by experimentation. Such an experiment would begin with a large number of PNS classes having fairly closely spaced thresholds. The $q_p$ values would then be found, as described above. Thereafter, adjacent columns of the $q_p$ matrix are examined to see if they are substantially the same. If they are, the two corresponding PNS classes are merged into one. The merging of adjacent columns continues until all the columns are sufficiently different from each other that no further merging can be performed.

TABLE 2

| PNS CLASSES | |
|---|---|
| Homogeneous PNS Class | Variance Range |
| $C_0$ | 0–4 |
| $C_1$ | 5–14 |
| $C_2$ | 15–29 |
| $C_3$ | 30–54 |
| $C_4$ | 55–94 |
| $C_5$ | 95–159 |
| $C_6$ | 160–264 |
| $C_7$ | 265–434 |
| $C_8$ | 435–709 |
| $C_9$ | 710–1069 |
| $C_{10}$ | 1070–1564 |
| $C_{11}$ | 1565–2239 |
| $C_{12}$ | 2240–3159 |
| $C_{13}$ | 3160–4414 |
| $C_{14}$ | 4415–6129 |
| $C_{15}$ | 6130–100,000 |

In this embodiment, it has been found that the experimentally derived variance thresholds of Table 2 can be described by employing a simple recursive process. $L_i$ denotes the variance threshold at the high end of the i-th variance interval, where i ranges from 1 to 16. $\Delta_i$ is defined as equal to $L_i - L_{i-1}$. The initial conditions are set such that $L_0 = 0$ and $\Delta_0 = \Delta_1 = 5$, the recursion $$\Delta_i = \Delta_{i-1} + \Delta'_{i-2}$$

along with the definition of $\Delta_i$ yields all the values of $L_i$.

In the above, $\Delta'$ is defined as follows:

for i from 2 to 9, $\Delta'_{i-2} = \Delta_{i-2}$, and for i from 10 to 16, $\Delta'_{i-2} = [\Delta_{i-2}/10]*5$.

If a macroblock satisfies neither the low-detail test nor the texture test, it is declared to be nonhomogeneous. Nonhomogeneous macroblocks are likely to occur at or near edges of objects in the scene. Perceptual noise sensitivity at these locations depends on many factors, including edge sharpness, object size, overall brightness, etc. Thus, there are a wide variety of possible PNS classes that can be defined for nonhomogeneous edge macroblocks. However, it has been found experimentally that a simple, but effective, method of categorizing such macroblocks into PNS classes is to use as the PNS class for the subblock the PNS class from Table 2 that is associated with the variance range into which the minimum subblock variance $v_{min}$ falls. This is because such a $q_p$ is good enough to quantize the most noise-sensitive subblock of the macroblock so that noise caused by quantization process will be within that allowed by the psycho-visual quality level at which the frame is being encoded. Furthermore, the remaining subblocks of the macroblock being quantized will be quantized more finely than is actually necessary, because they are also quantized with the same $q_p$ value as is employed for the subblock with variance $v_{min}$. Such a result is acceptable, however, despite requiring more bits to encode these remaining subblocks than might have otherwise been necessary, because there is no increase in the noise perceived within those subblocks beyond that allowed by the psycho-visual quality level of the frame.

As an example of the above-described technique, if a non-homogeneous macroblock included an area of low detail including two adjacent subblocks and an area of texture containing two adjacent subblocks, the low detail area would have $v_{min}$, because low detail areas have lower variances than textured areas. The macroblock is categorized into the PNS class that would have resulted if the entire macroblock was homogenous and had four subblocks that were the same as the subblocks in the low detail area, i.e., as if the macroblock variance was $v_{min}$. As a result, the $q_p$ selected for the entire macroblock is one that is sufficient to quantize the detail low area with the necessary fineness for such an area so as to not introduce therein additional perceivable noise beyond the level of noise acceptable for the psycho-visual quality level at which the image is being encoded. This same $q_p$ value, however, is also employed for the textured area of the macroblock. Since the textured area could have tolerated a larger $q_p$ value than the one actually employed, it is simply encoded to have less noise than could actually be tolerated with the psycho-visual quality level. Employing the PNS class corresponding to $V_{min}$ is therefore a conservative choice.

The content of a homogeneous macroblock can range from smoothness in a macroblock belonging to one of the low-variance PNS classes to fine texture in a macroblock belonging to one of the medium variance PNS classes, and ultimately to coarse texture in a macroblock belonging to one of the high-variance PNS classes. As described above, the low-variance PNS classes are generally highly sensitive to noise. However, if some of these low-variance PNS classes have very low or very high brightness they can be further classified into PNS classes that particularly indicate lower noise sensitivity than for a PNS class that has the same level of spatial activity but only a moderate brightness. Other factors, such as speed of motion in the scene or contextual aspects such as foreground/background, can also be taken into account by defining additional PNS classes, some of which may also have variance ranges overlapping with those defined in Table 2.

In accordance with an aspect of the invention, additional PNS classes of any type would add additional columns to Table 1. For example, in Table 1, PNS class $C_{3a}$ corresponds to a low detail, but very high or very low brightness PNS class while $C_{3b}$ corresponds to a PNS class having the same spatial activity level as $C_{3a}$ but a moderate brightness. The methodology employed to define such classes is similar to the above-described method and the additional classes created are added to Table 1 as additional columns. If more than one PNS class exists for a particular variance level, such as $C_{3a}$ and $C_{3b}$, when a non-homogeneous macroblock is encoded the PNS class that is more sensitive to noise, such as PNS class $C_{3b}$ should be chosen. As described above, this is a further conservative choice because it guarantees that all the subblocks of the macroblock, including the most noise sensitive subblock, are encoded to permit no more noise to be perceived than is permitted by the psycho-visual quality level at which the frame is being encoded.

Prediction error signal PREDERR is supplied to bits estimator unit 115. In accordance with an aspect of the invention, based upon the contents of signal PREDERR each subblock of every macroblock is assigned to a statistical activity class (SAC) so that later estimates of the number of bits required to encode a frame versus the psycho-visual quality of the encoded image can be made. One subgroup of statistical activity classes, referred to as the variance model activity classification (VMAC) subgroup, includes statistical activity classes based only on the subblock variances of signal PREDERR. Each SAC in the VMAC subgroup corresponds to a range of variances for signal PREDERR, as shown in Table 3. The similarity of Table 3 for VMAC subgroup statistical activity classes to that of Table 2 for PNS classes is noted, but such similarity is merely the result of implementational choices. Table 3 is employed by SAC categorizer 170 to perform the SAC classification for subblocks that are included within homogeneous macroblocks.

TABLE 3

STATISTICAL ACTIVITY CLASSES OF THE VMAC SUBGROUP

| SAC Class | Variance Range |
|---|---|
| $V_0$ | 0–5 |
| $V_1$ | 6–15 |
| $V_2$ | 16–30 |
| $V_3$ | 31–55 |
| $V_4$ | 56–96 |
| $V_5$ | 97–163 |
| $V_6$ | 164–267 |
| $V_7$ | 268–439 |
| $V_8$ | 440–712 |
| $V_9$ | 713–1075 |
| $V_{10}$ | 1076–1570 |
| $V_{11}$ | 1571–2245 |
| $V_{12}$ | 2246–3165 |
| $V_{13}$ | 3166–4420 |
| $V_{14}$ | 4421–6141 |
| $V_{15}$ | 6142–100,000 |

If there are sharp discontinuities in the PREDERR signal, a further subgroup of statistical activity classes can give improved results. Such a subgroup, referred to as an edge model activity classification (EMAC) subgroup, is defined further below. Thus, the statistical activity classes are divided into two subgroups, VMAC for relatively continuous areas and EMAC for areas containing high discontinuity.

In this embodiment, areas of high discontinuity are detected using methods similar to the homogeneous/nonhomogeneous segmentation in the above-described PNS classification, except that variances of subblocks of signal PREDERR are used instead of variances of subblocks of signal VIDIN. Subblocks that occur in areas of continuous variances are designated as VMAC, and Table 3 is employed by SAC categorizer 170 to perform the SAC classification by determining the SAC associated with the variance range into which the variance of the subblock falls. For subblocks that occur in areas of discontinuous variance, further processing is carried out as described below. Other well known methods for detection of discontinuity/edge areas may also be employed.

For high discontinuity/edge areas, four statistical activity classes belonging to the EMAC subgroup are defined. The first three EMAC classes, $E_0$ to $E_2$, depend upon the variance of the subblock. $E_0$ denotes a weak edge within a subblocks having a variance strength between 150 and 649, $E_1$ denotes a normal edge within a subblocks having a variance strength between 650 and 1899. $E_2$ denotes a strong edge within a subblocks having variance strength above 1900. The fourth EMAC class $E_3$ is used for horizontal or vertical edges that have a variance difference strength exceeding 650. These statistical activity classes are shown in Table 4 which is employed by SAC categorizer 170 to perform the SAC classification of subblocks that are in areas of high discontinuity/edges, as described below.

TABLE 4
STATISTICAL ACTIVITY CLASSES OF THE EMAC SUBGROUP

| SAC | Variance Range |
|---|---|
| $E_0$ | 150–649 |
| $E_1$ | 650–1899 |
| $E_2$ | >1900 |
| $E_3$ | — |

The process employed for subblock classification requires being able to distinguish edges from texture. To do this, the four subblock variances are evaluated in relation to their location inside the nonhomogeneous macroblock.

A subblock can either belong to an SAC in either the VMAC or the EMAC subgroup. Shown in FIG. 2 is exemplary macroblock 201 divided into subblocks 204, 206, 208 and 210. Each of subblocks 204, 206, 208 and 210 also has a corresponding PREDERR variance, respectively, $v_a$, $v_b$, $v_c$, and $v_d$. For purposes of providing a numerical example, $v_a=900$, $v_b=60$, $v_c=2000$, and $v_d=100$. The subblock variances are sorted by employing pairwise comparisons of the subblock variances. Six such comparisons are performed, three to determine $v_{max}$, two for $v_{min}$, and the last two for $v_{midh}$ and $v_{midl}$, the high and low middle variance values, respectively. Shown again in FIG. 3 is macroblock 201, with each of subblocks 204, 206, 208 and 210 labelled appropriately after sorting, in accordance with the above given numerical example.

Again, as described above, if the value of any subblock variance is less than the above-described threshold $T_0$, it is set to $T_0$. Three variance ratios are computed:

$$r_0 = \frac{v_{midl}}{v_{min}}, r_1 = \frac{v_{midh}}{v_{midl}}, \text{ and } r_2 = \frac{v_{max}}{v_{midh}}.$$

These ratios are sorted with two pairwise comparisons to determine from among them are $r_{max}$, $r_{mid}$, and $r_{min}$, respectively. Shown in FIG. 4 is array 401 containing variance ratios 403. Also shown is array 401 showing the results of the ratio sorting for the above given numerical example.

As a first step, the subblock having variance $v_{min}$ is initially assigned to the one of the statistical activity classes within the VMAC subgroup determined by its variance and Table 3. Also, the subblock having variance $v_{max}$ is initially assigned to the one of the statistical activity classes within the EMAC subgroup determined by its variance and Table 4. Therefore, in the numerical example, subblock 206 is assigned to SAC $V_4$ from among the VMAC subclasses and subblock 208 is assigned to $SACE_2$ from among the EMAC subclasses.

Thereafter, the two subblocks whose variance ratio is $r_{min}$ are merged to create a first area. Shown in FIG. 3 is first area 301 created by merging subblocks 204 and 208, the ratio of whose variances is $r_{min}$. If one of the subblocks of the first area has variance $v_{max}$, this area is initially declared an edge area and both subblocks therein are assigned to one of the statistical activity classes within the EMAC subgroup. Since subblock 208 has variance $v_{max}$, first region 301 is declared an edge area and accordingly subblocks 204 and 208 are labelled E. Initially the particular SAC of the EMAC subgroup into which each is categorized is determined from the variance of the subblock and Table 4. However, this initial SAC may be changed, as described below. For the numerical example this initial SAC is $E_3$. Alternatively, should one of the subblocks of the first area has variance $v_{min}$, each of the subblocks is assigned to one of the VMAC classes, according to its respective variance and Table 3. Such subblocks would be labelled V. If the area contains subblocks with only variances $v_{midh}$ and $v_{midl}$, further examination is required to classify the subblocks.

Subblocks having a variance ratio of $r_{mid}$ are merged into a second area, and both of the subblocks are assigned to statistical activity classes of the same subgroup, either the VMAC subgroup or the EMAC subgroup, to which one of them had previously been assigned. In the numerical example, $r_0=r_{mid}$ so that subblocks 206 and 210 are included in second area 303. Since subblock 206 was already categorized into an SAC of subgroup VMAC, so to is subblock 210, which is also, accordingly, labelled V. For the numerical example, subblock 210 is categorized into SAC $V_5$.

If the two subblocks whose variance ratio is $r_{min}$ were categorized into an SAC of the EMAC subgroup and, both subblocks are not of the $E_0$ class, $r_{min}<2$, and the subblocks are {204, 206}, {208, 210}, {204, 208} or {206, 210}, it is determined that a strong horizontal or vertical edge exists. In such a situation, each of the subblocks whose variance ratio is $r_{min}$ is assigned to the $E_3$ class. In the numerical example, if $v_a$ is changed from 900 to 1900 all the conditions for a vertical edge would exist in subblocks 204 and 208. Therefore, each of subblocks 204 and 208 would be assigned to the $E_3$ SAC.

Shown in FIG. 5 are the three possible types of nonhomogeneous macroblocks and all the allowed combinations of assignments of subblocks of the macroblocks to statistical activity classes in the EMAC (E) and VMAC (V) subgroups. In particular, macroblocks 501, 503, 505, 507, 509, 511, 513 and 515, are candidates to have a strong horizontal or vertical edge. This is because each of the enumerated macroblocks contains adjacent subblocks which have been categorized into statistical activity classes of the EMAC subgroup.

Returning to FIG. 1, for purposes of determining Q for the current frame, histogram counter (HIST) 145 must contain an estimate of the number of subblocks in each SAC that are also in a particular PNS class prior to start of encoding. These estimates are kept in a histogram table, HIS [PNS] [SAC], contained with HIST 145. Thus, the estimates are the table entries in the histogram table while the rows of the histogram table are indexed by PNS classes and the columns are indexed by the statistical activity classes.

In an exemplary embodiment, the histogram values stored in HIST 145 are computed while a previous frame is being encoded. All the values stored in the histogram table are cleared to zero (0) by HIST 145 prior to the starting of the encoding of the previous frame. Switches 140, 155, 160, 165 and 190 are in position 1 when the previous frame is being encoded. As each macroblock of the previous frame is processed it is categorized into one of the predetermined PNS classes by PNS categorizer 105 which supplies the PNS class to HISt 145 via switch 165. Similarly, for each subblock of each of the macroblocks, SAC categorizer 170 produces an SAC which is supplied to HIST 145 via switch 160. At the intersection of each row and column of the histogram table is stored the number of subblocks of the previous frame that have already been processed and were categorized into both the same particular PNS class and the same particular statistical activity class. As each subblock is processed, the location in the histogram table that is at the intersection of the row and column corresponding to both the SAC and the PNS class into which the subblock has just been categorized is incremented. The values that are developed and stored in the histogram table by the end of the encoding of the previous frame are then employed as the estimate of the number of subblocks in each SAC that are also in a particular PNS class for the current frame.

The selection of the psycho-visual quality level is performed once for each frame prior to the beginning of the encoding for that frame. At that time, quality determination unit 130 receives as an input a target number of bits for the frame to be encoded from the motion compensated predictive/interpolative video encoder (not shown), as well as estimates of the number of bits that would be necessary to encode the frame when each possible psycho-visual quality level is used from bits estimator 115. Quality determination unit 130 compares the estimated number of bits for each of the psycho-visual quality levels against the target number of bits for the frame and selects the psycho-visual quality level that corresponds to the estimate that most closely matches, and is less than, the target number of bits.

To estimate the number of bits that will be generated by encoding the current frame at each psycho-visual quality level, bits estimator 115 employs a) the values stored in the histogram table, which are estimates of the number of subblocks in each statistical activity class (SAC) that are also in a particular PNS class, b) a pre-stored bits table 150 (see Table 5), the values of which indicate the estimated number of bits that will be generated if a subblock in a particular statistical activity class is encoded with a particular $q_p$ and c) the $q_p$ values supplied by PNS categorizer 105. To determine such an estimate, switches 140, 155, 160, 165 and 190 are all placed in position 2. For a particular psycho-visual quality level Q', the estimate of the number of bits that are required to encode a frame at is given by

TABLE 5
EXAMPLE OF BITS TABLE (FOR SUBBLOCKS)

| | Statistical Activity Classes | | | | | | | |
|---|---|---|---|---|---|---|---|---|
| | VMAC Subgroup | | | | | | EMAC Subgroup | |
| $q_p$ | $V_3$ | $V_4$ | $V_5$ | $V_6$ | $V_7$ | $V_8$ | $E_0$ | $E_3$ |
| 5 | 241 | 309 | 398 | 481 | 598 | 689 | 771 | 996 |
| 7 | 160 | 219 | 290 | 373 | 455 | 531 | 599 | 798 |
| 9 | 116 | 169 | 222 | 283 | 357 | 426 | 483 | 667 |
| 12 | 90 | 132 | 162 | 216 | 283 | 335 | 386 | 538 |
| 15 | | | | 169 | 225 | 284 | 324 | 442 |
| 18 | | | | | | | 278 | 380 |

Despite the best efforts to encode a picture within a specified number of bits, it can happen that the number of bits actually generated exceeds the specification, perhaps greatly so. This is typically the result of the fact that the histogram table is only an estimate of the distribution of the subblocks over the PNS classes and the statistical activity classes and such estimates can be wrong, especially at scene changes. To prevent the typical buffer of the motion compensated predictive/interpolative video encoder (not shown) from overflowing, the fullness of the buffer is monitored by PNS categorizer 105 at regular intervals, for instance five times per frame. An indication of the fullness of the encoder buffer is received by PNS categorizer 105 as signal buffer fullness. Depending on the buffer fullness, the Q being employed as the index into the $q_p$ table for the frame being encoded can be adjusted in a progressive and orderly fashion. The nature and direction of these adjustments to Q will vary with fullness of the buffer. Decreasing the Q employed results in a more coarse quantization and fewer bits produced at the expense of the psycho-visual quality perceived by the view. However, such an orderly reduction in the psycho-visual quality is preferable to permitting the buffer to overflow.

The foregoing merely illustrates the principles of the invention. Thus, although various components of adaptive perceptual quantizer 100 are shown as discrete functional elements their respective functions will typically be realized by appropriate program code executing in a $$\sum_{PNS_{indx}} \sum_{SAC_{indx}} HIS[PNS_{indx}][SAC_{indx}] * BITS\_TABLE[q_p\_TABLE[Q'][PNS_{indx}]][SAC_{indx}]$$

where $PNS_{indx}$ is a variable whose range spans over the entire plurality of PNS classes, $SAC_{indx}$ is a variable whose range spans over the entire plurality of statistical activity classes and $HIS[PNS_{indx}][SAC_{indx}]$ is the corresponding value from the histogram table. Values of $PNS_{indx}$ and $SAC_{indx}$ are supplied by PNS indx 175 and SAC indx 180, respectively, so as to perform the double sum over all of the PNS classes and all of the statistical activity classes. $q_p\_TABLE[Q'][PNS_{indx}]$ corresponds to the value of $q_p$ for psycho-visual quality level Q'. The value of Q' spans over the entire range of psycho-visual quality levels. The number of bits is computed once for each Q' value. Q' is supplied by Q' indx 185. The timing of the supplying of the values of by PNS indx 175, SAC indx 180 and Q' indx 185 are synchronized by a controller, not shown. Such synchronization is well known by those skilled in the art.

Shown in Table 5 is an abridged exemplary bits table 150. The methods for developing such a table will be readily apparent to those skilled in the art.

processor, in a manner well known in the art. It will thus be appreciated that those skilled in the art will be able to devise various arrangements which, although not explicitly described or shown herein, embody the principles of the invention and are thus within its spirit and scope.

For example, in one such embodiment the quantizer step size matrix stored in memory 125 can be downloaded from a storage unit (not shown) once for each frame. Therefore, the matrix need not be the same from frame to frame. Furthermore, more than one $q_p$ table 135 may be stored in PNS categorizer 105. Which of the stored tables is used for encoding any particular frame may be made dependent upon the type of coding used for the particular frame. Thus, intraframe coded frames (I) frames could have a first $q_p$ table, motion compensated predictively (P) coded frames could have a second $q_p$ table and motion interpolated (B) frames could have a third $q_p$ table. In another embodiment signal PREDERR may be used in addition to or instead of VIDIN in the PNS classification. This is indicated by the dashed line input to PNS categorizer 105.

In an alternative embodiment, the frame to be encoded may be processed in accordance with a two pass process. So that two passes may be achieved, the portion of signal VIDIN corresponding to the frame is temporarily buffered in a memory. During the first pass the actual distribution of the subblocks over the PNS classes and statistical activity classes of the frame to be encoded are determined and stored in the histogram table. As a result, the estimated number of bits required to encode the frame for each psycho-visual quality level will be the actual number of bits. Therefore, after the best matching psycho-visual quality level is selected by quality determination 130, the number of bits produced during the actual encoding of the frame, which is the second pass, will be exactly the number that was determined for that psycho-visual quality level during the first pass. Therefore, no corrections will be necessary.

In a further alternative embodiment, HIST 145 may actually contain more than one histogram table or the histogram table may have more than one region. In such an embodiment one histogram is stored per frame type, e.g., I, P and B frames. The histogram that is actually used in computing the number of bits for a particular frame is the stored for the same type of frame.

We claim:

1. A method for use in generating quantization parameters to be employed by a video coder when said video coder is processing at least a portion of a video signal comprised of frames, the method comprising the steps of:
   dividing a particular one of said frames into a plurality of regions;
   categorizing each of the regions into one of a plurality of predetermined perceptual noise sensitivity classes;
   selecting a target psycho-visual quality level for the frame from among a plurality of predetermined target psycho-visual quality levels; and
   providing a quantization parameter for each of said regions as a function of the perceptual noise sensitivity class of each of said regions and said psycho-visual target quality level.

2. The invention as described in claim 1 wherein said step of categorizing includes the steps of:
   determining a perceptual noise sensitivity level for each of the regions; and
   mapping each perceptual noise sensitivity level into a corresponding one of a plurality of predetermined perceptual noise sensitivity classes.

3. The invention as described in claim 1 wherein said step of selecting employs a predetermined function that relates the target psycho-visual quality level to an estimated complexity of the video signal of the frame and a number of bits specified for encoding the frame.

4. The invention as described in claim 2 wherein regions are macroblocks and said step of determining determines a perceptual noise sensitivity level for each macroblock thereby characterizing each macroblock according to the amount of noise that can be added to the macroblock with respect to the disturbing effect that the adding of such noise will have on a viewer perceiving said macroblock with said added noise.

5. The invention as described in claim 1 wherein said regions are of two types, a first type of region being a macroblock and a second type of region being a subblock, a plurality of subblocks being grouped together to form a macroblock, said step of selecting including the steps of:
   categorizing each of said subblocks into one of a plurality of statistical activity classes;
   developing estimates of the number of bits required to encode the frame at each psycho-visual quality level of said plurality;
   comparing said estimates to a predetermined target number of bits that are available to encode said frame; and
   picking the psycho-visual quality level having an estimate that is closest to but does not exceed said target number of bits.

6. The invention as described in claim 5 wherein each estimate of said step of developing is given for any particular psycho-visual quality level Q' by:

$$\sum_{PNS_{indx}} \sum_{SAC_{indx}} HIS[PNS_{indx}][SAC_{indx}] * BITS\_TABLE[q_p\_TABLE[Q'][PNS_{indx}]][SAC_{indx}]$$

where $PNS_{indx}$ is a variable whose range spans over the entire plurality of perceptual noise sensitivity classes, $SAC_{indx}$ is a variable whose range spans over the entire plurality of statistical activity classes, $q_p\_TABLE[Q'][PNS_{indx}]$ corresponds to the value of a quantization parameter for use in encoding macroblocks belonging to perceptual noise sensitivy class $PNS_{indx}$ that must be encoded to achieve psycho-visual quality level Q' and $HIS[PNS_{indx}][SAC_{indx}]$ is an estimate of the number of subblocks in statistical activity class $SAC_{indx}$ that are also in a perceptual noise sensitivity class $PNS_{indx}$.

7. Apparatus for use in the quantization of at least a portion of a video signal comprised of frames, said apparatus comprising:
   first means for categorizing first regions into which said frame is divided into one of a plurality of predetermined perceptual noise sensitivity classes;
   means for selecting a target psycho-visual quality level for encoding said frame from a plurality of predetermined psycho-visual quality levels; and
   means for determining a quantization parameter for each of said regions, said means for determining being responsive to the perceptual noise sensitivity class into which each of said regions is categorized by said means for categorizing and the target psycho-visual quality level selected for said frame by said means for selecting.

8. The apparatus as defined in claim 7 wherein said means for selecting further includes:
   means for generating estimates of the number of bits required to encode said frame with each of said predetermined plurality of psycho-visual quality levels;
   means for receiving a predetermined target number of bits that are available to encode said frame; and
   means for picking the psycho-visual quality level that has an estimate that is closest to said target number of bits.

9. The apparatus as defined in claim 7 wherein said means for selecting further includes:
- means for generating estimates of the number of bits required to encode said frame with each of said predetermined plurality of psycho-visual quality levels;
- means for receiving a predetermined target number of bits that are available to encode said frame; and
- means for picking the psycho-visual quality level that has an estimate that is closest to, but does not exceed, said target number of bits.

10. The apparatus as defined in claim 8 wherein said means for generating estimates includes:
- second means for categorizing second regions into which said frame is divided into one of a plurality of predetermined statistical activity classes; and
- means, responsive to said first and second means for categorizing, for determining the number of bits that will be generated by the encoding of one of the second regions that is included within one of the first regions such that a particular psycho-visual quality level is achieved.

11. The apparatus as defined in claim 10 wherein said first regions are macroblocks and said second regions are subblocks.

12. The apparatus as defined in claim 7 further including:
- means for supplying said quantization parameter as an output;
- means for quantizing, responsive to said quantization parameter, for quantizing a portion of an encoded version of said video signal.

* * * * *